United States Patent [19]
Lichtenfels, II et al.

[11] Patent Number: 5,669,262
[45] Date of Patent: Sep. 23, 1997

[54] REMOVABLE ULTRASONIC TRANSDUCER WITH INTEGRAL ELECTRICAL DISCONNECT

[75] Inventors: Frederick Lloyd Lichtenfels, II; Ralph Ernest Burt, both of Vergennes, Vt.

[73] Assignee: Simmonds Precision Products, Inc., Richfield, Ohio

[21] Appl. No.: 589,128

[22] Filed: Jan. 22, 1996

Related U.S. Application Data

[63] Continuation of Ser. No. 173,842, Dec. 27, 1993, abandoned.

[51] Int. Cl.$^6$ .................................................. G01F 23/28
[52] U.S. Cl. .................................................. 73/290 V
[58] Field of Search .................... 73/290 V; 361/733; 367/908; 439/76

[56] References Cited

U.S. PATENT DOCUMENTS

| | | | |
|---|---|---|---|
| 2,741,749 | 4/1956 | Smith | 439/673 |
| 2,892,992 | 6/1959 | Grovemiller et al. | 439/673 |
| 3,693,445 | 9/1972 | Johnson | 73/290 V |
| 3,971,619 | 7/1976 | Rohrssen | 439/674 |
| 4,014,213 | 3/1977 | Parquet | 73/290 R |
| 4,107,994 | 8/1978 | Sogo | 73/290 V |
| 4,199,207 | 4/1980 | Lee | 439/674 |
| 4,325,416 | 4/1982 | Hermann | 73/290 V X |
| 4,345,106 | 8/1982 | Canfield et al. | 73/290 R X |
| 4,703,652 | 11/1987 | Itoh et al. | 73/290 V |
| 4,770,038 | 9/1988 | Zuckerwar et al. | 73/290 V |
| 4,901,245 | 2/1990 | Olsen et al. | 73/290 V X |
| 5,040,993 | 8/1991 | Krug et al. | 439/75 |
| 5,121,628 | 6/1992 | Merkl et al. | 73/290 V |
| 5,172,594 | 12/1992 | Dyke | 73/290 V |
| 5,303,585 | 4/1994 | Lichte | 73/290 V |
| 5,315,563 | 5/1994 | Lichtenfels, II et al. | 367/908 X |

*Primary Examiner*—William A. Cuchlinski, Jr.
*Assistant Examiner*—Willie Morris Worth
*Attorney, Agent, or Firm*—Richard A. Romanchik; Carl A. Rankin

[57] ABSTRACT

An externally mounted transducer assembly for an ultrasonic liquid level measuring device that utilizes a piezoelectric crystal for generating ultrasonic pulses to be transmitted through a tank or the line containing a volume of liquid. Electrical conductors are formed integrally with the fuel tank for connecting the transducer to other components of the system. The wall of the tank is provided with an arrangement for removably attaching the transducer housing thereto. The tank is provided with electrical contacts that connect to the conductors that are integral with the tank. Also, electrical contacts in the transducer housing are connected to the transducer for providing current thereto. When the transducer housing is attached to the tank, the transducer is thereby connected to the measuring system circuit.

10 Claims, 2 Drawing Sheets

REMOVABLE ULTRASONIC TRANSDUCER WITH INTEGRAL ELECTRICAL DISCONNECT

This is a file wrapper continuation of application Ser. No. 08/173,842, filed Dec. 27, 1993 now abandoned.

This invention relates to ultrasonic measuring systems and especially those that utilize an ultrasonic transducer for sending and receiving ultrasonic signals that are directed through a volume of liquid in a container or fuel tank to measure the level of the liquid. More particularly, the invention relates to the mounting of an ultrasonic transducer to a fuel tank and particularly to the means for electrically connecting the transducer to provide operating current.

Ultrasonic measuring systems are commonly used to measure the level of liquid in containers such as fixed storage tanks, fuel storage reservoirs and aircraft fuel tanks. These systems generally use an ultrasonic transducer that transmits an acoustical pulse from a location near the bottom of the tank to the surface of the liquid. Then an echo returns from the surface of the liquid to the transducer and provides an echo signal. A receiver responds to the echo signal, and the total elapsed time is determined. Thus, further data is calculated for display.

In these systems, a transducer assembly containing a piezoelectric crystal is usually located at or near the bottom of the tank. Where the height of the tank is relatively low, and the there is no interferring structure in the vicinity, the transducer generally transmits its ultrasonic pulses directly into the contained volume of liquid. In other situations, however, such as where the tank is relatively deep, it is often desirable to use a tubular probe or stillwell inserted approximately vertically in the tank. The stillwell generally has openings through its tubular wall near the bottom of the tank to admit liquid from the surrounding volume. The tube is usually opened at the top so that the height of the column of liquid in the tube is essentially the same as the height of the contained volume of liquid.

Most ultrasonic liquid level measuring systems in the prior art have utilized a transducer mounted inside the tank generally at the bottom, and in typical circumstances at the bottom of the stillwell if one is used. One disadvantage of this arrangement is that it is extremely difficult to remove and replace the ultrasonic transducer. It is at least necessary to drain the tank before the transducer can be removed. Also, due to the limited access space available, removal is awkward, time consuming and could result in damage. Another problem is that working within a fuel tank is dangerous to the personnel involved in view of the combustible fumes and other hazards.

One solution to this problem is to mount the ultrasonic transducer in a housing that is normally attached to the bottom or floor, externally of the fuel tank. This would necessitate transmitting the ultrasonic pulse through the wall of the tank, however, this is not a serious problem. In these circumstances, the conventional practice has been to locate the cable for supplying current to the piezoelectric crystal outside of the tank. When replacing the externally mounted sensor, however, the cable is subject to manipulation and could be damaged. Also, the cable could be damaged as a result of non-related service in the general vicinity. More importantly, the installation of such a sensor in a wing-type fuel tank would necessitate special provisions for a wiring channel and in some instances, such as in the case of high performance military aircraft, this might not be possible.

These same problems occur in the case of a flange-mounted stillwell wherein the transducer is mounted at the bottom of the stillwell but externally of the fuel tank. In the flange mounted stillwell, an opening is provided in the bottom of the tank, and the stillwell with a radial flange at its base is inserted into the tank and secured to the bottom of the tank in a manner that provides a tight seal. Then the transducer is mounted externally to the sealed floor of the stillwell.

The transducer external mounting arrangement of the present invention, reduces the difficulties described above and affords other features and advantages heretofore not obtainable.

SUMMARY OF THE INVENTION

The present invention is concerned with the mounting of an ultrasonic transducer for a liquid level measuring system, externally of a tank in which a volume of liquid is contained. The transducer is adapted to generate ultrasonic pulses to be transmitted through the volume of liquid in the tank for determining the level of the liquid. The invention provides electrical conductors formed integrally with the tank and connected to other components such as the current supply for the piezoelectric crystal. The wall of the tank is provided with an external arrangement for removably attaching the transducer housing thereto. The arrangement includes a fixed connecting device on the external side of the wall and an additional connecting device on the transducer housing engagable with the fixed connecting device. In accordance with the invention, the fixed connecting device is provided with fixed electrical contacts connected to the conductors that are integral with the tank. The other connecting device on the transducer housing is provided with additional electrical contacts that are connected to the transducer for providing a current thereto. The two connecting devices thus provide the electrical contact necessary to place the transducer in the measuring system circuit.

DESCRIPTION OF THE PREFERRED EMBODIMENT

Referring more particularly to the drawings, there are shown four types of external mounting arrangements for removably connecting transducer assemblies to a liquid container such as an aircraft fuel tank. In each of these figures there is shown an ultrasonic transducer, 10, 30, 50, 70 mounted below the floor of an aircraft fuel tank and adapted to transmit an acoustical pulse through the volume of liquid contained in the tank to the surface of the contained volume. An echo returns from the surface of the liquid to the transducer and provides an echo signal. A receiver responds to the echo signal so that the total elapsed time from transmission to reception may be determined.

Since the elapsed time is a function of the height of the column of liquid in the tank, the level of liquid may be readily determined using techniques well known to those skilled in the art. The calculated data may then be displayed or used for other computations.

Each of the transducer assemblies 10, 30, 50 and 70 includes a piezoelectric crystal (not shown) which may be, for example, a lead zirconite-titanite piezoelectric ceramic in the form of a disc with electrodes on each face to produce a roughly planar compressive wave. The crystal is acoustically matched to the fuel by means included in the housing and having an acoustic impedance chosen for optimum energy transfer. Each of the assemblies is provided with conductors to provide electrical current for the piezoelectric crystal.

Figure 1:
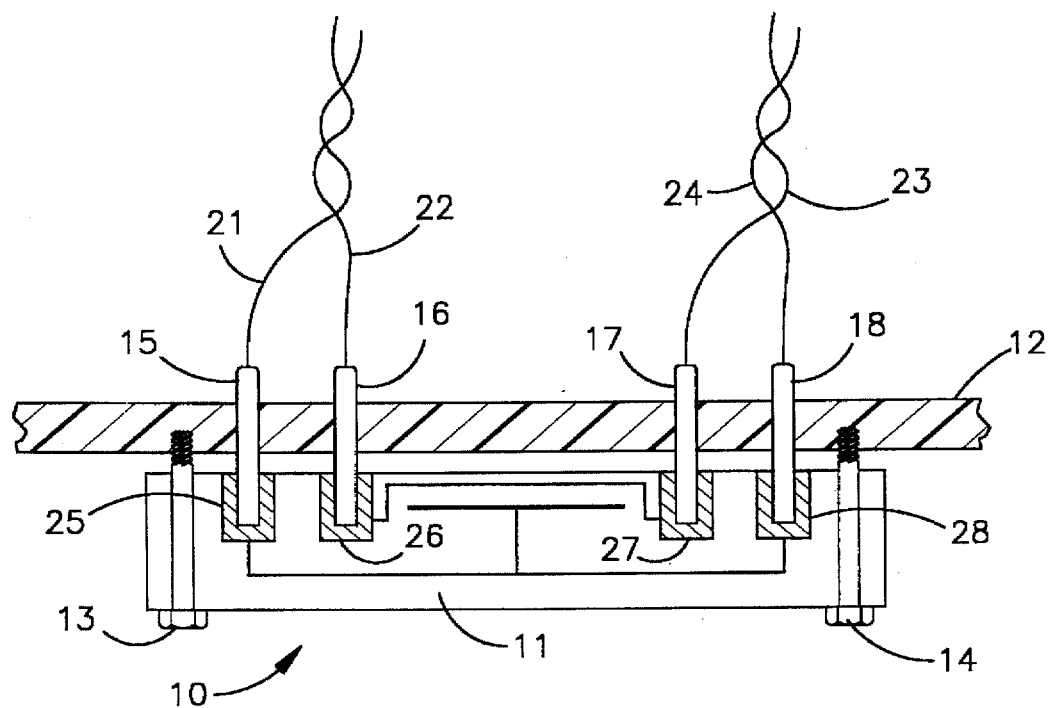
FIG. 1 is a sectional view in somewhat diagrammatic form illustrating an externally mounted ultrasonic transducer connected in accordance with the invention.

Referring to FIG. 1, there is shown a transducer assembly 10 having a housing 11 which contains the piezoelectric crystal and the electrical conductors therefore. The housing is adapted to be mounted externally of an aircraft fuel tank by securing it below the floor 12 of the tank. In the embodiment shown, the housing 11 is secured by means of bolts 13 and 14 which pass through openings in the housing and extend into threaded recepticals formed in the floor 12. The bolts may also be secured to weld nuts which are fastened to the bottom of the floor as is well known to those skilled in the art.

In accordance with the invention, sealed pins 15, 16, 17 and 18 are embedded in the floor of the tank and extend therethrough. The pins are sealed to the floor of the tank to prevent leakage and the protruding portions that extend into the interior of the tank are connected to electrical conductors 21, 22, 23 and 24 respectively.

The portions of the pins 15, 16, 17 and 18 that extend outwardly from the floor of the tank are received in sockets 25, 26, 27 and 28 formed in the top of the housing 11 that engages the floor 12 of the tank. The sockets have electrical contacts that serve to connect the pins to the piezoelectric crystal.

In aviation applications, it is desirable to have redundancy and duplicate pairs of pins 15, 16, 17 and 18 are provided in case of failure in connection with one pair. The arrangement enables the transducer assembly to be easily connected or disconnected and the connecting means is integral with the tank itself on the one hand and with the housing 11 on the other hand.

Figure 2:
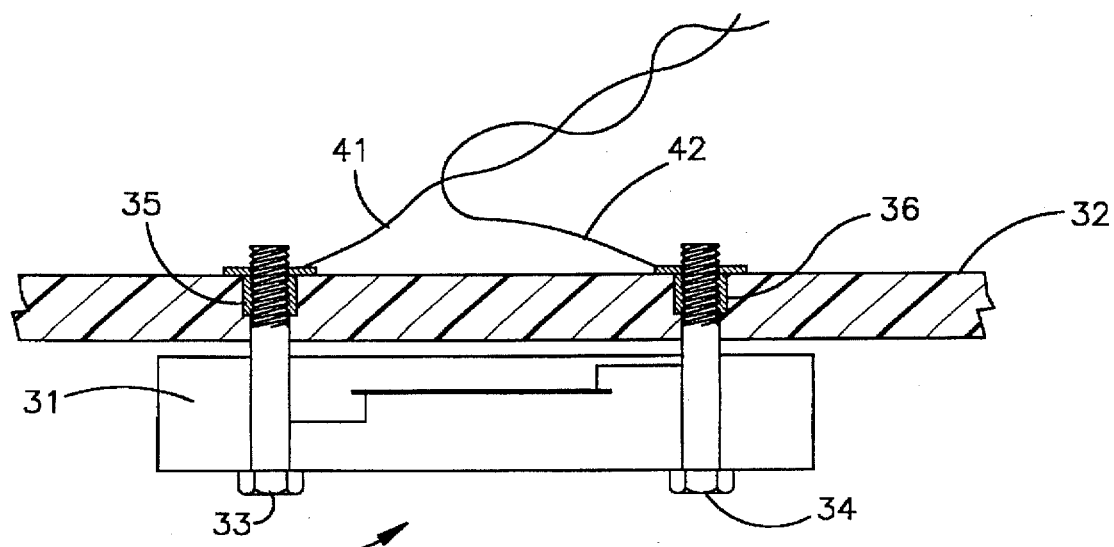
FIG. 2 is another sectional view in somewhat diagrammatic form illustrating another externally mounted ultrasonic transducer connected in a manner embodying the invention.

Referring to FIG. 2, there is shown a transducer assembly 30 having a housing 31 that is attached externally to the floor 32 of an aircraft fuel tank. In this instance, the housing is secured with bolts 33 and 34 that extend entirely through the floor and are received in threaded fasteners or weld nuts 35 and 36. The weld nuts are connected to conductors 41 and 42 located within the fuel tank and which form the part of a cable which is electrically connected to other components of the liquid level measuring system. While only two leads are shown, it is usually desirable in the interest of redundancy to have another pair of leads connected to another pair of weld nuts which in turn receive another pair of bolts. The portions of the bolts 33 and 34 that extend through the housing are connected to conductor means within the housing that in turn connects to leads from the piezoelectric crystal.

Figure 3:
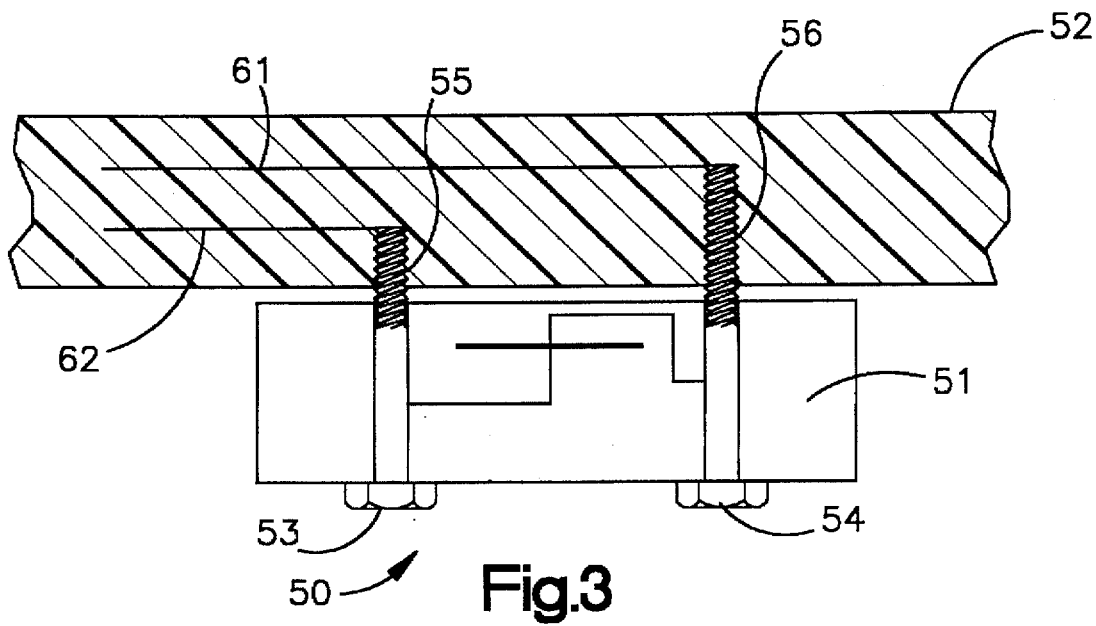
FIG. 3 is a sectional view also in somewhat diagrammatic form illustrating still another arrangement for mounting an ultrasonic transducer to the floor of a fuel tank in accordance with the invention.

Referring to FIG. 3 there is shown another embodiment of the invention wherein, a transducer assembly 50, having a housing 51 is secured externally to the floor 52 of an aircraft fuel tank such as a wing tank, wherein the tank is integral with the wing and formed of a composite material such as a plastic laminate. In this instance, bolts 53 and 54 extending through the housing are received in threaded openings or sockets 55 and 56 formed in the floor or wing panel 52. The panel is provided with conductors 61 and 62 embedded in the laminations and which are adapted to be engaged by the ends of the bolts 53 and 54 to provide electrical contact.

The sockets 55 and 56 may be threaded metal inserts embedded in the panel 51 in such a way as to be in electrical contact with the conductors 61 and 62 that are embedded in the laminations. An alternative technique is to secure conductive strips directly to the interior surface of the panel 52 which is formed of non-conductive material.

The arrangements of FIGS. 1–3 all show the respective transducer assembly 10, 30, 50 mounted to the floor of the tank. The invention may also be advantageously used, however, where the transducer is attached to other areas of a tank.

Figure 4:
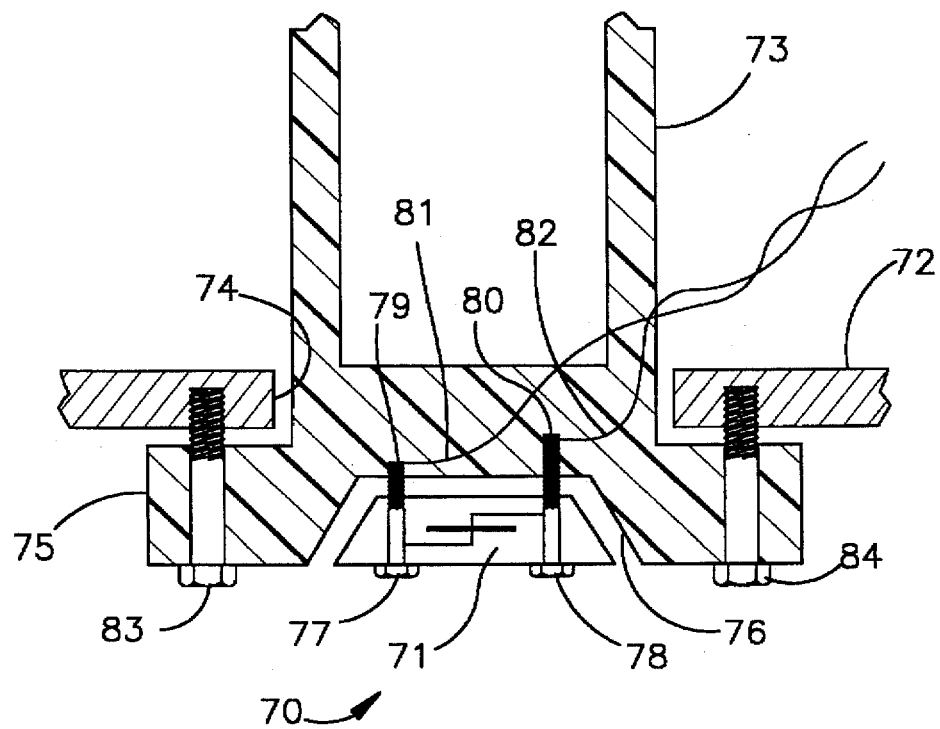
FIG. 4 is a fragmentary sectional view in somewhat diagrammatic form illustrating an external mounting arrangement for an ultrasonic transducer associated with a stillwell which in turn is mounted to the floor of a fuel tank, in accordance with the invention.

Referring to FIG. 4 there is shown an alternate form of the invention wherein, a transducer assembly 70 has its housing 71 secured to the bottom of a stillwell 73 which is mounted in the tank. The stillwell 73 is of the flange-mounted type that is mounted externally of the floor 72 of the tank so as to be easily removed when necessary. The stillwell or probe 73 has an axially extending tubular wall that extends through a mating opening 74 formed in the floor 72. The lower end of the stillwell has a radial flange 75 that engages the outer surface of the floor in an annular zone surrounding the opening 74 and provides a tight seal. In this instance, the flange is secured to the floor using threaded fasteners or bolts 83 and 84.

The bottom of the stillwell 73 has a recess 76 formed therein and adapted to receive the housing 71. The housing is secured to the bottom of the stillwell using bolts 77 and 78 which are received in threaded receptacles 79 and 80 formed in the bottom of the stillwell 73. The receptacles 79 and 80 may be threaded metal elements that provide the electrical contacts which when engaged by the bolts 77 and 78 complete the circuit to the piezoelectric crystal. This is much the same arrangement as illustrated in FIGS. 2 and 3.

A pair of conductors 81 and 82 are connected to the threaded receptacles 79 and 80 and portions thereof, are embedded in the floor and wall of the stillwell 73 which is formed of non-conductive material.

With this arrangement, the transducer assembly 70 may be easily installed and removed as necessary without the need for special electrical connection and disconnection. Another advantage of this arrangement is that it permits gauging to a lower level.

While the invention has been shown and described with respect to specific embodiments thereof, this is for the purpose of illustration rather than limitation and other variations and modifications of the specific devices herein shown and described will be apparent to those skilled in the art all within the intended spirit and scope of the invention. Accordingly, the patent is not to be limited in scope and effect to the specific embodiments herein shown and described nor in any other way that is inconsistent with the extent to which the progress in the art has been advanced by the invention.

We claim:

1. A system for measuring the level of liquid contained within the interior of a tank having a tank wall, the system comprising:

electrical conductors for conducting electrical energy through the interior of the tank;

an ultrasonic transducer for disposal on the exterior of the tank, said transducer having first electrical contacts; and, second electrical contacts provided for placement through the tank wall and electrically connected to said electrical conductors for electrically connecting said first electrical contacts to said electrical conductors.

2. A system as defined in claim 1 wherein said second electrical contacts comprise conductive pins adapted to be located in and extend outwardly from said tank wall.

3. A system as defined in claim 2 wherein said first electrical contacts comprise conductive sockets adapted to receive said pins.

4. A system for measuring the level of liquid contained within the interior of a tank having a tank wall and electrical conductors disposed within the interior of the tank, the system comprising:

an ultrasonic transducer for disposal on the exterior of the tank, said transducer having first electrical contacts; and second electrical contacts for placement in the tank and being electrically connected to said electrical conductors for electrically connecting said first electrical contacts to the electrical conductors.

5. A system according to claim 4, wherein said first electrical contacts attach said transducer to the tank in a fixed position.

6. A system as defined in claim 5 wherein said second electrical contacts comprise receptacles with internal threads located in said tank wall.

7. A system as defined in claim 6, wherein said first electrical contacts comprise bolts adapted to be threadedly received in said receptacles.

8. A system for measuring the level of liquid contained within the interior of a tank having a tank wall, the system comprising:

electrical conductors for conducting electrical energy through the interior of the tank;

an ultrasonic transducer for disposal on the exterior of the tank, said transducer having first electrical contacts; and, second electrical contacts provided within the tank wall and electrically connected to said electrical conductors for electrically connecting said first electrical contacts to said electrical conductors.

9. A system as defined in claim 8 wherein said tank is formed of a plastic laminate.

10. A system as defined in claim 9 wherein said electrical conductors are embedded in said plastic laminate.

* * * * *